United States Patent [19]

Greiss

[11] 4,055,317
[45] Oct. 25, 1977

[54] AFT MAIN DECK SPLIT LEVEL GALLEY

[75] Inventor: Rashad S. Greiss, Mercer Island, Wash.

[73] Assignee: The Boeing Company, Seattle, Wash.

[21] Appl. No.: 701,109

[22] Filed: June 30, 1976

[51] Int. Cl.² ............................................ B64D 11/04
[52] U.S. Cl. ............................... 244/118 P; D12/195; 244/119
[58] Field of Search ............... 244/118 R, 118 P, 117, 244/119; 105/327; D12/195

[56] References Cited

U.S. PATENT DOCUMENTS

| 1,384,784 | 7/1921 | Shankland | 244/119 |
| 3,517,899 | 6/1970 | Vernon | 244/118 R |

OTHER PUBLICATIONS

Interavia, Feb. 1970, p. 116.
Interavia, Oct. 1969, p. 1667.
Interavia, Sept. 1969.
Flight, Sept. 1949, pp. 417–420.

Primary Examiner—Trygve M. Blix
Assistant Examiner—Charles E. Frankfort
Attorney, Agent, or Firm—Christensen, O'Connor, Garrison & Havelka

[57] ABSTRACT

A galley for storing and preparing food for on-board service in a passenger aircraft has its main floor located in the aft portion of the fuselage and raised above the main passenger deck. The distance between the ceiling of the main passenger deck and the floor is sufficient to provide head room for personnel using the galley. The airplane has a rearwardly concave, spherically-shaped pressure bulkhead positioned in the aft of the fuselage. The floor of the galley abuts the spherical bulkhead to take advantage of the increased floor space provided by the concave portion of the bulkhead. The galley includes facilities for preparing food stored in modular, portable containers and mobile service carts. The service carts are normally stored in recesses provided below countertop level in the galley when not in use. The modular containers and service carts are lifted between the galley floor and the main passenger deck by a lift proportioned to accommodate a mobile service cart or single modular unit. A stairway interconnects the main passenger deck and the galley floor for galley ingress and egress by service personnel. Additional modular unit storage is provided in the forwardly facing portion of the galley between the galley floor and the floor of the main passenger deck.

11 Claims, 4 Drawing Figures

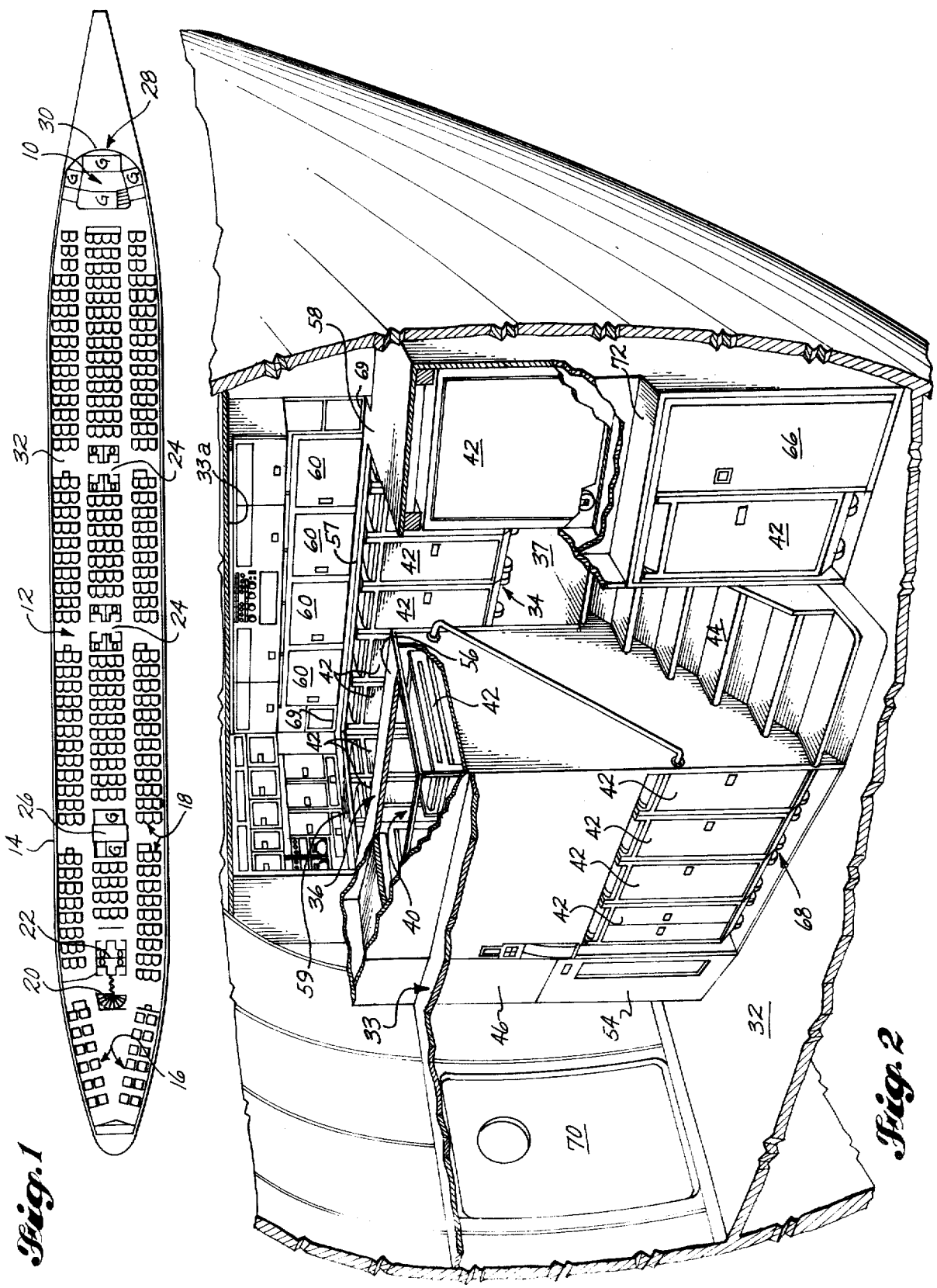

4,055,317

AFT MAIN DECK SPLIT LEVEL GALLEY

BACKGROUND OF THE INVENTION

The present invention relates to passenger aircraft and more particularly to a galley located within the confines of the passenger compartment of the aircraft.

Food and beverages for passengers on conventional, commercial, passenger airplanes are normally dispensed from storage and service centers, conventionally called galleys, on the main passenger deck of the aircraft. The galleys require a significant amount of premium floor space on the passenger deck that could otherwise be used for passenger seating to increase operating revenues. One prior art suggestion for increasing seating capacity on the passenger deck of a two deck aircraft, disclosed in U.S. Pat. No. 3,517,899 to R. L. Vernon, is to dispose all or a portion of the galley in the lower cargo deck of a two deck aircraft. This arrangement has met with some acceptance, eliminating some of the space requirements for galleys on the passenger deck and thereby allowing an increase in seating capacity. A drawback to this arrangement is the trade-off between increased passenger seating and the consequently increased passenger revenues and decreased cargo carrying capacity and the resultantly diminished cargo revenues.

An alternative to locating the galley on the cargo deck in a two deck passenger aircraft presents itself in a three deck passenger aircraft such as the Model 747 passenger and cargo aircraft manufactured by The Boeing Company of Seattle, Washington. As disclosed in a copending application, Ser. No. 624,961, filed Oct. 22, 1975, a galley can be located in the aft portion of the upper lobe of the three deck aircraft. This arrangement provides significant advantages but requires some structural and configurational reworking of the upper deck of the aircraft.

It is a broad object of the present invention to maximize the passenger seating space and thus the passenger revenues and to maximize the available cargo carrying space and thus the cargo revenues while still locating a galley within the confines of the main passenger compartment. Further objects of the present invention are to locate the galley so as to promote efficiency in food and beverage service by effectively separating the food storage and preparation area from that required for food and beverage dispensing; to increase aircraft versatility by removing the conventional aft galley complex out of the potential main deck baggage, passenger, and cargo areas; to improve the environment in the passenger cabin by reducing galley noise and food odor normally present in the passenger cabin and to promote efficiency for cabin personnel who prepare and serve food and beverages; to provide additional food and beverage storage area without locating a galley in the upper lobe of a three deck aircraft or on the cargo deck; to provide accessible waste disposal areas under the floor of the relocated galley and to provide installation locations for and access to auxiliary equipment, such as refrigeration equipment, that supports the food storage and service functions; and to provide a galley that can be used in conjunction with a galley located in the upper lobe of a three deck aircraft or located in the cargo area of a two or three deck aircraft.

SUMMARY OF THE INVENTION

In accordance with the foregoing objects, and other objects that will become apparent to one of ordinary skill after reading the following specification, the present invention provides an improved galley for storing and preparing food for service to passengers on board the passenger deck of an aircraft. The galley of the present invention is situated within the confines of the passenger compartment in the aft end of the fuselage. The galley comprises a personnel supporting floor positioned adjacent the rear pressure bulkhead of the passenger compartment and spaced above the passenger deck. The floor is positioned below the ceiling in the aft end of the passenger compartment by a distance sufficient to allow adequate head room for personnel standing on the floor. Means are provided for connecting the floor with the passenger deck so that service personnel have access between the floor and the passenger deck. The floor supports and serves as an access area to means for storing food-containing modules and to means for preparing food and beverages for service to passengers on the passenger deck. In the preferred embodiment, a lift is provided that runs between the passenger deck and the galley floor for raising and lowering food storage and service modules between the galley floor and the passenger deck. The galley of the present invention is most advantageously employed in an aircraft having a rearwardly concave, spherically shaped bulkhead in the aft of the fuselage. In this most preferred embodiment, the galley floor is spaced above the passenger deck by a distance sufficient for it to be located near the rearwardmost portion of the spherically shaped bulkhead. Thus, the galley is provided with more floor area than a comparable facility placed at the level of the passenger deck floor without taking additional passenger seating space.

BRIEF DESCRIPTION OF THE DRAWINGS

A better understanding of the present invention can be derived by reading the ensuing specification in conjunction with the accompanying drawings wherein:

FIG. 1 is a simplified plan view in longitudinal section through an aircraft fuselage depicting a galley located in the aft portion of the passenger compartment in accordance with the present invention;

FIG. 2 is an isometric view of the galley of the present invention with portions of the aircraft fuselage, passenger deck and ceiling cut away;

DETAILED DESCRIPTION

Figure 3:
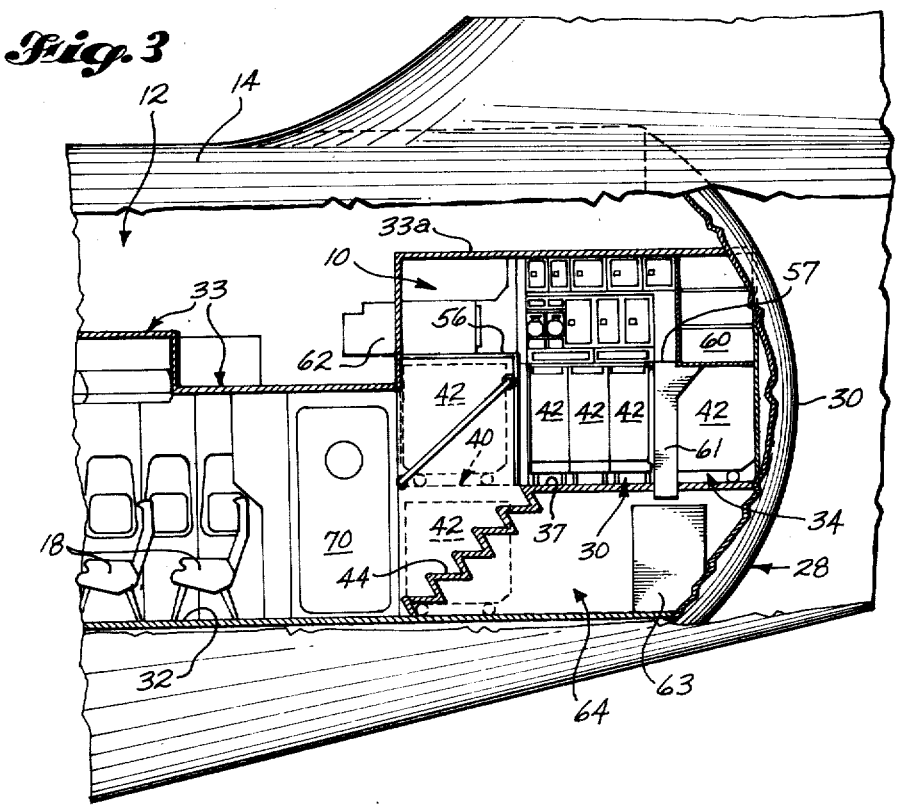
FIG. 3 is an elevation view in partial cross-section of the galley of the present invention.

Referring first to FIG. 1, the aft galley, generally designated 10, is situated in the aft portion of the passenger compartment 12 within the fuselage 14 of a wide bodied passenger aircraft. For simplicity, the wings and empennage of the aircraft have been omitted from the drawing. In this embodiment of the invention, the passenger compartment is situated on the middle deck while a deck below the passenger deck functions as a cargo deck. A third, upper, forward deck (not shown) is situated within a lobe at the forward end of the fuselage above the passenger deck. The seating on the passenger deck is divided into a forward first class section wherein larger, more widely spaced seats 16 are appropriately arranged and into an economy or tourist class section extending aft from the first class section wherein slightly smaller, more compactly arranged seats 18 are situated. A spiral staircase 20 is positioned at the aft end of the first class section to provide access for passengers and aircraft personnel to the upper lobe deck of the aircraft. A set of lavatories 22 are positioned aft of the staircase in the forward part of the economy class section while second and third sets of lavatories 24 are positioned in the central portion of the passenger deck and slightly aft of the center of the passenger deck, respectively.

A galley service center 26 is located between the forward set of lavatories 22 and the center sets of lavatories 24. The galley service center includes storage space and service facilities such as coffee makers and food warmers. If desired, the galley service center can be employed as a passenger deck service center for an upper deck galley of the type disclosed in the aforementioned copending application, Ser. No. 624,961.

Figure 4:
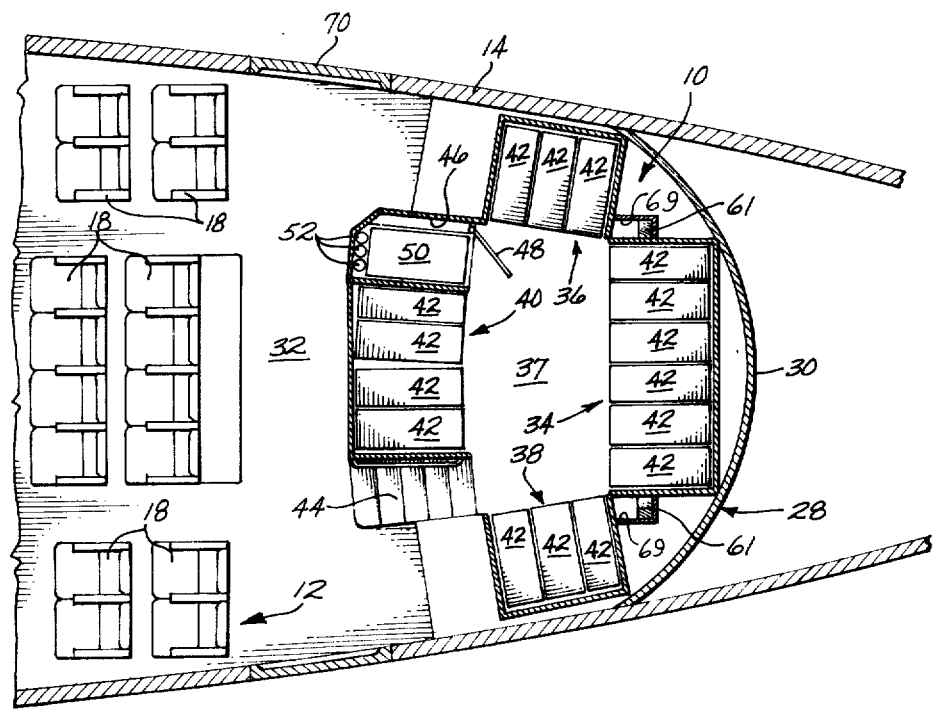
FIG. 4 is a cross-sectional view of the galley of the present invention taken along section line 4—4 of FIG. 3.

The aft galley 10 of this embodiment of the pressent invention is situated at the rearmost portion of the tourist class section on the passenger deck and abuts the rear pressure bulkhead 28. The pressure bulkhead 28 is normally provided in a passenger aircraft to contain pressurized cabin air provided for the passengers convenience when the airplane is flying at high altitudes. The pressure bulkhead is normally spherically shaped to provide a strong structure that can withstand the cabin pressure with a minimum weight penalty. Normally, the spherical bulkhead is in the form of a spherical shell that forms a rearwardly projecting, concave wall in the rear portion of the passenger section. Referring to FIGS. 3 and 4, the spherical bulkhead 28 is located so that its rearwardmost central portion 30 is about midway between the floor 32 of the passenger deck and the uppermost portion of the fuselage 14. Normally, the passenger compartment is provided with a false ceiling 33 above which are housed auxiliary equipment, control cables and other equipment necessary for operation of the aircraft. In this embodiment of the invention, the central, rear portion of the false ceiling 33 is sufficiently high to form a raised ceiling 33a for the aft galley 10. The space taken by the raised ceiling 33a does not detract from the space otherwise available between the false ceiling 33 and the uppermost portion of the fuselage 14 and still provides the space required for the aforementioned equipment and cables. The floor 37 of the galley is spaced above the passenger deck floor 32 by a distance sufficient to position it at a level adjacent the central portion 30 of the spherical bulkhead 28 and is positioned low enough to provide adequate head room (80 inches) between the galley floor 37 and the aft raised ceiling 33a. By so positioning the galley floor 37, advantage can be taken of the additional longitudinal space provided by the concave portion of the bulkhead 30 to provide additional floor space for food storage and preparation in the aft galley without detracting from or utilizing any of the space normally occupied by passenger seating. By providing this additional space, the galleys normally situated at intermediate locations along the passenger deck can be eliminated, leaving only the forward galley service center 26 (FIG. 1) directly on the passenger deck itself. By so arranging the galley and the remainder of the floor space on the passenger deck of the aircraft, up to 29 or more passenger seats can be added to the main passenger deck, potentially increasing the passenger revenues by a significant factor.

Referring now to FIGS. 2 through 4, the aft galley 10 comprises an aft storage area 34, a starboard storage area 36, a port storage area 38 and a forward storage area 40. The four storage areas are essentially inwardly opening recesses formed by cabinetwork that extend from the galley floor 37 upwardly to about conventional counter height. Each of the storage areas is sized to receive modular food storage units (or service carts) 42. The food storage units are conventionally designed and are mounted on wheels so that they can be easily transported to and from the galley to service passengers and to and from the aircraft for replenishment of the food and beverages stored therein. Each of the storage areas 34, 36, 38 and 40 is depthproportioned so that when the fronts of the storage units 42 are in place, they are flush with the front end of the storage areas. The aft storage area is sufficiently wide to store up to six modular storage units while the port and starboard storage areas are sufficiently wide so that each can house three modular units. The forward storage area is sufficiently wide to house four of the modular units.

A staircase 44 is positioned on the port side of the forward storage unit 40 to allow access by service personnel between the passenger deck floor 32 and the galley floor 37. A lift shaft housing 46 is located on the starboard side of the forward storage unit and has an upper door 48 opening onto one side of the central area of the galley floor 37. The upper door 48 opens to allow the modular food storage units 42 to be placed on a lift platform 50 for lowering from the galley floor 37 to the passenger deck 32 and vice versa. The lift platform 50 is mounted in the elevator housing 46 for vertical reciprocal movement and is powered by suitable electrical actuators 52 or other conventional lift motivating equipment. The lift shaft housing 46 also has a lower door 54 that opens forwardly onto the passenger deck 32 to allow modular units to be removed from and placed onto the lift platform 50 from the passenger floor level.

As depicted in FIG. 2, the top surface of the forward storage area 40 forms a rectangular platform or countertop 56, extending from adjacent the location of the stairway 44 toward the starboard side of the aircraft and terminating over the lift shaft 46. Four large self-cleaning ovens 62 occupy the space above the countertop 56. The back portion of the ovens 62 extend forwardly above the false ceiling 33 in the aft portion of the passenger deck. This countertop can be used by food service personnel as a preparation and handling area and as a distribution base for food and beverages. Countertops 57, 58, and 59 are also located over the aft, port and starboard storage areas 34, 38 and 36 respectively, and can likewise be used for preparation and handling of food and beverages. Additional storage cabinets are provided above the starboard storage area 36, above the aft storage area 34, and above the port storage area 38. Although the particular use of each of the units, such as ovens 62 and refrigeration units 60, form no part of the present invention per se, they are depicted as part of the aft galley to illustrate the maximum utilization of space achievable with the present invention. Additional storage units and recesses for coffee makers and the like are situated above the starboard storage area 36.

The galley floor 37 is sufficiently elevated from the passenger deck floor to provide an additional modular unit storage area between the passenger deck floor 32 and the bottom of the galley floor 37. A central lower storage area 68 is located adjacent the forward portion of the galley 10 below the galley level forward storage area 40 and opens forwardly toward the passenger seating area. The central lower storage area 68 houses an additional four modular storage and/or service units 42. An additional port lower storage area is situated between the stair 44 and the port side of the fuselage and houses an additional modular unit 42 and a storage cabinet 66. A countertop 72 is provided above the lower port storage area for food preparation. Additional food and beverage service units (not shown) are also located above the countertop 72.

Another advantage of the aft galley of the present invention resides in the equipment housing space 64 created between the galley floor 37 and the rearward extension of the passenger deck 32 below the aft galley. This equipment housing space is accessible through an opening behind the modular storage units 42 in the central storage area 68 on the passenger deck 32. The equipment housing space 64 is more than adequate to house the auxiliary equipment such as refrigeration compressors and the like necessary to operate a full service food and beverage preparation and handling area in the aft galley 10. Moreover, there is adequate working room for maintenance personnel in the equipment housing space 64 should it become necessary to enter the space 64 and repair the equipment.

Another advantage of the raised aft galley floor is the provision of a waste collection container in the equipment housing area 64. Waste chute openings 69, situated above and adjacent each end of the aft countertop 57 provide a convenient location for disposal of unused food and other items that are used only once. Waste chutes 61 extend from behind and below the waste chute openings downwardly into the equipment housing area 64. Waste containers 63 (only one of which is shown in FIG. 3) are situated under waste chutes 61 and can be easily removed and replaced when the aft galley is being serviced.

The aft galley 10 is located adjacent one of the rear ingress and egress doors 70, providing a convenient access location through which ground personnel can remove the modular storage units and replace those units with substitutes containing freshly prepared food and beverages. Since passenger ingress and egress is normally accomplished through doors in the center portion of the fuselage rather than at the rear of the fuselage, the aft galley location allows the galley to be serviced during unloading and loading of passengers. In many prior art galley arrangements, ground support personnel are required to wait until after passengers have deplaned before replenishing food in prior art centrally located galleys. With the aft galley 10 of the present invention, ground support personnel can immediately begin removing used modular units from the galley and transferring new modular units onto the aircraft as soon as the airplane comes to rest at the passenger terminal without interfering with passenger ingress and egress. Moreover, the lift mechanism completely eliminates any necessity for ground support personnel to carry modular units from the galley floor 37 to the passenger deck 32 for access to the fuselage door 70.

It will readily be seen by one of ordinary skill in the art that the aft galley of the present invention fulfills all of the objects set forth above. After reading the foregoing specification, one of ordinary skill in the art will be able to effect various changes, substitutions of equivalents and vary other aspects of the invention as broadly disclosed herein. For example, the lift shaft can be located at any position along the forward portion of the galley by merely rearranging the location of the forward storage area. Likewise, the stairwell can be positioned at any location along the forward portion of the aft galley 10 to allow personnel access to the galley area. Moreover, the level of the galley floor can be slightly altered without losing a large amount of additional floor space, and in fact can be slightly elevated to increase the available floor space providing the ceiling of the passenger compartment is high enough. In addition, the arrangement of the storage areas and preparation facilities can be rearranged to suit the needs of a particular aircraft user. It is therefore intended that the protection granted by Letters Patent hereon be limited only by the definition contained in the appended claims and equivalents thereof.

What is claimed is:

1. In an airplane fuselage having a passenger deck, a ceiling, an aft end, and an aft pressure bulkhead, said bulkhead defining a concave recess in the rearward direction, said passenger deck abutting said bulkhead adjacent the bottom thereof, an improved galley for storing and preparing food for service to passengers on board said passenger deck comprising:

a personnel supporting floor positioned adjacent said bulkhead, said floor being spaced above said passenger deck and being positioned below said ceiling by a distance sufficient to allow average head room for personnel standing on said floor, said floor abutting said bulkhead at a location thereon spaced rearwardly from the location at which said passenger deck abuts said bulkhead, means for connecting said floor with said passenger deck for providing access for personnel between said floor and said passenger deck, and means located on said floor for storing food-containing modules and for preparing food for service to passengers on said passenger deck.

2. The improved galley of claim 1 further comprising: lift means for raising and lowering food-containing modules between said floor and said passenger deck.

3. The improved galley of claim 1 wherein said floor abuts said bulkhead adjacent the rearwardmost portion of the concave surface defined thereby.

4. The improved galley of claim 3 wherein said bulkhead is a segment of a spherical shell.

5. The improved galley of claim 1 wherein said floor and said passenger deck define a forwardly opening recess therebetween, said passenger deck forming the floor of said recess, said recess having a height sufficient to receive food-containing modules for storage.

6. In an airplane having a fuselage, a passenger deck, a ceiling, a rear bulkhead defining a concave recess in a rearward direction, and an aft end, said passenger deck abutting said bulkhead adjacent the bottom portion thereof, an improved galley for preparing food for service to passengers on board said passenger deck comprising:

a personnel supporting floor positioned adjacent the aft end of said fuselage, said floor being elevated above said passenger deck and being positioned below said ceiling a sufficient distance to allow average head room for personnel using said floor, said floor abutting said bulkhead adjacent the rearwardmost portion of the concave surface of said bulkhead and abutting said bulkhead at a location spaced rearwardly from the location at which said passenger deck abuts said bulkhead, means connecting said floor with said passenger deck for providing access for personnel between said floor and said passenger deck, means on said floor for storing food-containing modules and for preparing food for serving to passengers on said passenger deck, and means for raising and lowering food-containing modules between said floor and said passenger deck.

7. The improved galley of claim 6 wherein said means for raising and lowering modules comprises a platform sized to carry a food-containing module, a housing for said platform extending from said passenger deck to and above said floor, and means located within said housing for raising and lowering said platform between said passenger deck and said floor, said housing having a door opening onto said floor and a door opening onto said passenger deck.

8. The improved galley of claim 5 wherein said means for providing access comprises a stairway joining said passenger deck and said floor.

9. The improved galley of claim 5 wherein said storage means comprises storage cabinets located along the forward end of said floor, along the sides of said floor, and along the aft portion of said floor, the central portion of said floor remaining open for personnel access to said cabinets, said cabinets having openings facing inwardly toward the center portion of said floor.

10. The improved galley of claim 9 wherein said elevator means is located adjacent the cabinets at the forward end of said floor adjacent one side of said fuselage and wherein said means for providing access for personnel is located adjacent the cabinets at the forward end of said floor adjacent the other side of said fuselage.

11. The improved galley of claim 10 wherein said one side of said fuselage contains an ingress and egress door adjacent said elevator means through which said galley can be serviced.

* * * * *